US011956613B2

(12) United States Patent
Yang et al.

(10) Patent No.: US 11,956,613 B2
(45) Date of Patent: Apr. 9, 2024

(54) SOUND-PRODUCING DEVICE AND ELECTRONIC TERMINAL

(71) Applicant: Goertek Inc., Shandong (CN)

(72) Inventors: Jianbin Yang, Weifang (CN); Shousong Qiang, Weifang (CN); Chunfa Liu, Weifang (CN)

(73) Assignee: Goertek Inc., Shandong (CN)

( * ) Notice: Subject to any disclaimer, the term of this patent is extended or adjusted under 35 U.S.C. 154(b) by 169 days.

(21) Appl. No.: 17/773,464

(22) PCT Filed: Nov. 5, 2020

(86) PCT No.: PCT/CN2020/126700
§ 371 (c)(1),
(2) Date: Apr. 29, 2022

(87) PCT Pub. No.: WO2021/088915
PCT Pub. Date: May 14, 2021

(65) Prior Publication Data

US 2022/0377463 A1 Nov. 24, 2022

(30) Foreign Application Priority Data

Nov. 8, 2019 (CN) ......................... 201911089360.2

(51) Int. Cl.
*H04R 9/02* (2006.01)
*H04R 1/02* (2006.01)

(52) U.S. Cl.
CPC ............... *H04R 9/025* (2013.01); *H04R 1/02* (2013.01)

(58) Field of Classification Search
CPC . H04R 9/025; H04R 1/02; H04R 1/06; H04R 9/027; H04R 9/043; H04R 9/06; H04R 9/04
See application file for complete search history.

(56) References Cited

U.S. PATENT DOCUMENTS

2009/0060250 A1* 3/2009 Proni ....................... H04R 9/06 381/396
2013/0077816 A1* 3/2013 Her ....................... H04R 9/025 381/412
2019/0104369 A1* 4/2019 Kim ....................... H04R 9/043

FOREIGN PATENT DOCUMENTS

CN 204948348 U 1/2016

* cited by examiner

*Primary Examiner* — Tuan D Nguyen
(74) *Attorney, Agent, or Firm* — Baker Botts, LLP

(57) ABSTRACT

Disclosed is a sound-producing device, comprising: a housing having an accommodating room where a magnetic circuit system is installed; a voice coil including a bobbin and a voice coil body; a conductive member having a first connecting part fixed to the voice coil, a second connecting part fixed to the housing, and an elastic part located between the two connecting parts; the conductive member is combined on the voice coil body, the magnetic circuit system is provided with an avoidance part corresponding to the conductive member; the voice coil is provided with an inner conduction structure, the housing is provided with an outer conduction structure that is in electrical conduction with an external circuit; and upon being electrically connected with the inner conduction structure, the first connecting part passes through the avoidance part and extends to the housing, and is electrically connected with the outer conduction structure.

18 Claims, 3 Drawing Sheets b: A Sound-producing Device Installed with a Prior Art Damper: Resonant Frequency F0 = 195 Hz c: A Sound-producing Device Installed with the Conductive Member of the Present Disclosure: Resonant Frequency F0 = 170 Hz b: A Sound-producing Device Installed with the a Prior Art Damper c: A Sound-producing Device Installed with the Conductive Member of the Present Disclosure

SOUND-PRODUCING DEVICE AND ELECTRONIC TERMINAL

CROSS-REFERENCE TO RELATED APPLICATION

This application is a National Stage of International Application No. PCT/CN2020/126700, filed on Nov. 5, 2020 which claims priority to Chinese Patent Application No. 201911089360.2, filed on Nov. 8, 2019, both of which are hereby incorporated by reference in its entirety.

TECHNICAL FIELD

The present disclosure relates to the technical field of electro-acoustic conversion, and particularly to a sound-producing device and an electronic terminal.

BACKGROUND

A damper is one of basic components of the sound-producing device, and is mainly used to ensure the correct position of a voice coil in a magnetic gap, to keep the vibration system reciprocating only in the axial direction when the voice coil is stressed, and to provide the elastic force for the vibration system to reciprocate.

At present, in a traditional sound-producing device, such as in a loudspeaker device, the damper is usually fixedly provided on a bobbin of the voice coil, and is of a corrugated shape, and the structure of the traditional damper increases the height of the loudspeaker in its vibration direction; in addition, the traditional sound-producing device needs an additional lead coil to realize the electrical connection between the voice coil and an external circuit, wherein the lead coil needs to occupy an internal space of the sound-producing device during the routing process.

Therefore, in order to solve any of the above technical problems, the present disclosure provides a novel sound-producing device.

SUMMARY

An object of the present disclosure is to provide a sound-producing device.

According to a first aspect of the present disclosure, a sound-producing device is provided. The sound-producing device comprises:

- a housing, the housing having an accommodating room where a magnetic circuit system is installed;
- a voice coil, the voice coil including a bobbin and a voice coil body wound outside the bobbin, the bobbin being in the shape of a round tube; a bottom end of the voice coil is suspended in a magnetic gap of the magnetic circuit system;
- a conductive member, the conductive member having a first connecting part fixed to the voice coil, a second connecting part fixed to the housing, and an elastic part located between the first connecting part and the second connecting part;
- the conductive member is combined to a root region of the voice coil body, the magnetic circuit system is provided with an avoidance part corresponding to the conductive member; the voice coil is provided with an inner conduction structure, the housing is provided with an outer conduction structure that is in electrical conduction with an external circuit; and upon being electrically connected with the inner conduction structure, the first connecting part of the conductive member passes through the avoidance part of the magnetic circuit system and extends to the housing, and is electrically connected with the outer conduction structure.

Optionally, the conductive member is connected to a side of the voice coil body close to a bottom end face thereof.

Optionally, the inner conduction structure is a pad fixed on the side of the voice coil body close to the bottom end face thereof, the first connecting part is fixed to the pad by welding; the voice coil body has an enameled wire fixed to the pad by welding.

Optionally, the second connecting part is in a hooked shape, the housing is provided with a fixing pillar, and the second connecting part is sleeved on the fixing pillar.

Optionally, the conductive member is formed by integrally winding a metal wire.

Optionally, the metal wire is copper wire, iron wire, steel wire or alloy wire.

Optionally, the outer conduction structure is provided close to the fixing pillar of the housing; the outer conduction structure is a solder piece injected on the housing;

the second connecting part is fixed to the solder piece by welding upon being fixed together with the fixing pillar.

Optionally, the solder piece is exposed on an outer surface of the housing.

Optionally, the elastic part is in a plane structure.

Optionally, the elastic part spreads outward along a direction from the first connecting part toward the second connecting part, with a buffer section forming a spreading angle which is not less than 10°.

Optionally, the conductive member is a two-piece separate structure symmetrically arranged on both sides of the voice coil body; or, the conductive member is a three-piece or four-piece separate structure evenly distributed on a circumference of the voice coil body.

Optionally, the magnetic circuit system includes a basin-shaped U iron where a magnet is provided; and the avoidance part is a notch provided on the U iron.

Optionally, notches correspondingly provided on the U iron are of the same number as conductive members provided on the voice coil body, and each of the notches is of an opening angle ranging from 20° to 40°.

Optionally, the sound-producing device has a resonant frequency F0 of 50 Hz to 300 Hz.

Optionally, the sound-producing device is a round sound-producing device or a square sound-producing device.

Optionally, the sound-producing device is a large bass or mid-range sound-producing device.

According to another aspect of the present disclosure, an electronic terminal is provided, comprising the above-mentioned sound-producing device.

Optionally, the electronic terminal is a car audio or a speaker.

The beneficial effect of the present disclosure is: compared with the prior art in which the damper is provided on the bobbin of the voice coil, in the sound-producing device provided by the present disclosure in which the conductive member of the sound-producing device is provided at the root region of the voice coil body, the present disclosure can better provide the axial compliance of the sound-producing device, and reduce radial offset and rocking vibration; at the same time, by installing the conductive member in the root region of the voice coil body, it is possible to save the space required by the traditional damper, so that the sound-producing device can be made smaller in height and size.

The present disclosure provides a sound-producing device, wherein the conductive member has an elastic part, which extends from the first connecting part to the second connecting part in a curved manner, and preferably may form a plane structure; compared with the prior art, the present disclosure can ensure the flatness of the product, reduce the height of the sound-producing device in the vibration direction thereof, reduce the volume of the sound-producing device, and realize the miniaturization of the sound-producing device.

The present disclosure provides a sound-producing device, wherein on the one hand, the conductive member can support and fix the position of the voice coil; on the other hand, the conductive member realizes the electrical communication between the voice coil and the external circuit via the inner conduction structure and the outer conduction structure; compared with the prior art, the present disclosure reduces the use of lead coil and the height of the sound-producing device in the vibration direction thereof.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which are incorporated in the description and constitute a part of the description, illustrate embodiments of the present disclosure and, together with the description thereof, serve to explain the principles of the present disclosure.

DETAILED DESCRIPTION

Figure 1:
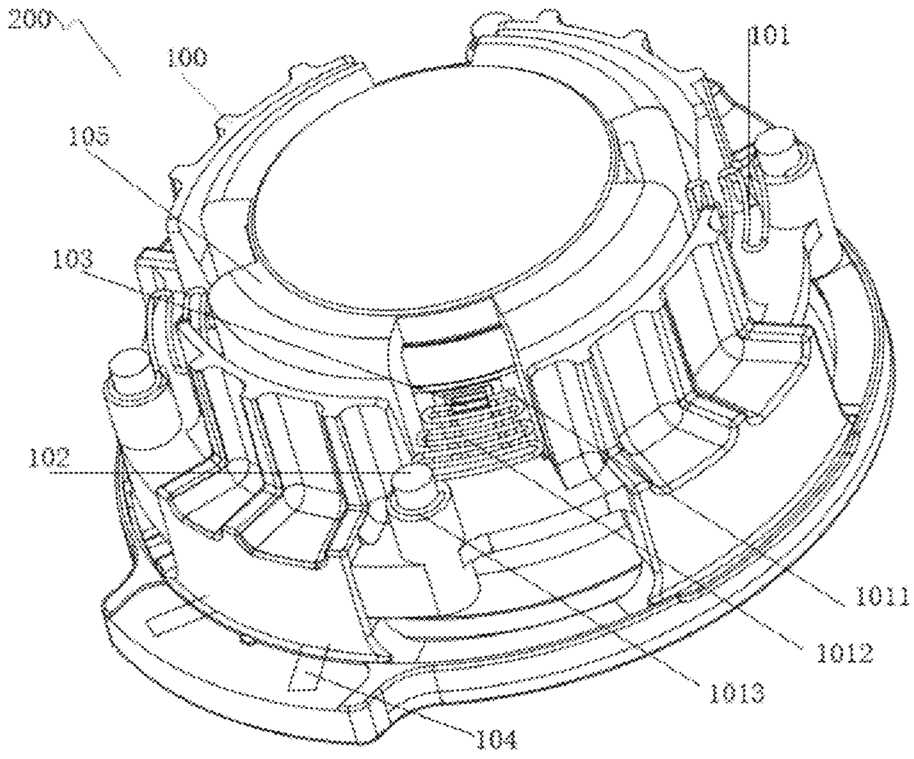
FIG. 1 shows a schematic structural diagram of the sound-producing device of the present disclosure.

Various exemplary embodiments of the present disclosure will now be described in detail with reference to the accompanying drawings. It is to be noted that unless otherwise specified, relative arrangement, numerical expressions and numerical values of components and steps illustrated in these embodiments do not limit the scope of the present disclosure.

Description to at least one exemplary embodiment is in fact illustrative only, and is in no way limiting to the present disclosure or application or use thereof.

Techniques, methods and devices known to those skilled in the prior art may not be discussed in detail; however, the techniques, methods and devices shall be regarded as part of the description where appropriate.

In all the illustrated and discussed examples, any specific value shall be explained as only exemplary rather than restrictive. Thus, other examples of exemplary embodiments may have different values.

It is to be noted that similar reference numbers and alphabetical letters represent similar items in the drawings below, such that once a certain item is defined in a drawing, further discussion thereon in the subsequent drawings is no longer necessary.

According to one embodiment of the present disclosure, a sound-producing device is provided. The sound-producing device comprises:

a housing, the housing having an accommodating room where a magnetic circuit system is installed;

a voice coil, the voice coil including a bobbin and a voice coil body wound outside the bobbin; a bottom end of the voice coil is suspended in a magnetic gap of the magnetic circuit system;

a conductive member, the conductive member having a first connecting part fixed to the voice coil, a second connecting part fixed to the housing, and an elastic part located between the first connecting part and the second connecting part;

the conductive member is combined to a root region of the voice coil body, the magnetic circuit system is provided with an avoidance part corresponding to the conductive member; the voice coil is provided with an inner conduction structure, the housing is provided with an outer conduction structure that is in electrical conduction with an external circuit; and upon being electrically connected with the inner conduction structure, the first connecting part of the conductive member passes through the avoidance part of the magnetic circuit system and extends to the housing, and is electrically connected with the outer conduction structure.

The present disclosure provides a sound-producing device, wherein the conductive member of the sound-producing device is provided at the root region of the voice coil body, compared with the prior art in which the damper is provided on the bobbin of the voice coil, the present disclosure can better provide the axial compliance of the sound-producing device, and reduce radial offset and rocking vibration; at the same time, by installing the conductive member in the root region of the voice coil body, it is possible to save the space required by the traditional damper, so that the sound-producing device can be made smaller in height and size.

The present disclosure provides a sound-producing device, wherein the conductive member has an elastic part, which extends from the first connecting part to the second connecting part in a curved manner, and preferably may form a plane structure; compared with the prior art, the present disclosure can ensure the flatness of the product, reduce the height of the sound-producing device in the vibration direction thereof, reduce the volume of the sound-producing device, and realize the miniaturization of the sound-producing device.

In one example, FIG. 1 shows a schematic structural diagram of the sound-producing device of the present disclosure.

Wherein, the sound-producing device 200 includes a housing 100, and the housing 100 has an accommodating room where a magnetic circuit system is installed; in this example, the magnetic circuit system includes U iron.

The sound-producing device includes a voice coil, the voice coil includes a bobbin and a voice coil body wound outside the bobbin, and the bobbin is in the shape of a circular tube; a bottom end of the voice coil is suspended in a magnetic gap of the magnetic circuit system;

the sound-producing device includes a conductive member 101, the conductive member 101 has a first connecting part 1011 fixed to the voice coil, a second connecting part 1013 fixed to the housing, and an elastic part 1012 located between the first connecting part 1011 and the second connecting part 1013; wherein, as shown in FIG. 1, the elastic part 1012 extends from the first connecting part 1011 to the second connecting part 1013 in a curved manner along a S shape, the elastic part is in a plane structure, and compared with the corrugated damper in the prior art, the conductive member in this example has a special structural design, and can reduce the height of the sound-producing device in the vibration direction thereof.

In one example, the conductive member 101 is combined with a root region of the voice coil body, and the magnetic circuit system is provided with an avoidance part corresponding to the conductive member; the voice coil is provided with an inner conduction structure, and the housing is provided with an outer conduction structure that is in electrical conduction with an external circuit.

Particularly, the conductive member 101 of the first connecting part 1011 is connected to a side of the voice coil body close to a bottom end face thereof; the second connecting part 1013 is connected to the housing 100; for example, the first connecting part 1011 is fixed to the side of the voice coil body close to the bottom end face thereof via the inner conduction structure 103, wherein the inner conduction structure 103 is welded to the enameled wire of the voice coil body, that is, realizing the electrical connection between the first connecting part and the voice coil body.

The housing 100 is provided with a fixing pillar 102, and the second connecting part 1013 is sleeved on the fixing pillar 102; for example, the second connecting part 1013 is in a hooked shape, and the second connecting part 1013 is sleeved on the fixing pillar 102.

Wherein, the outer conduction structure 104 is provided close to the fixing pillar 102 of the housing; the second connecting part 1013 is connected to the outer conduction structure, wherein the outer conduction structure is configured to be connected to the external circuit, that is, realizing the electrical connection between the second connecting part 1013 and the external circuit.

Figure 3:
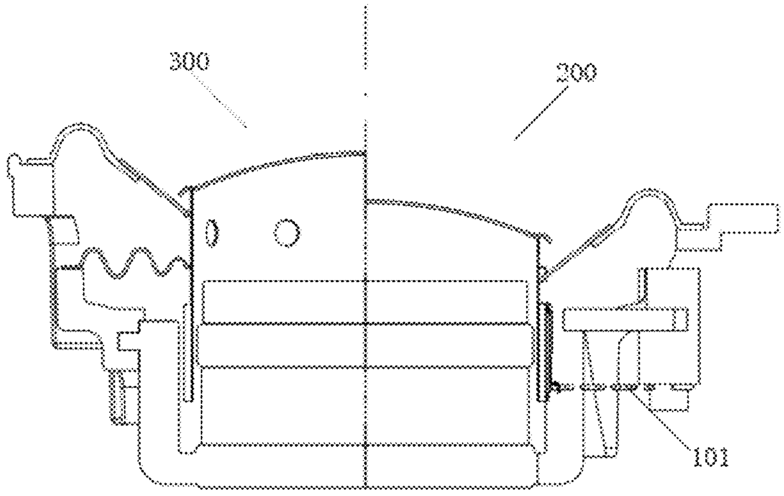
FIG. 3 shows a comparison diagram of the height of the sound-producing device of the present disclosure and the height of the existing sound-producing device.

The conductive member 101 realizes the electrical communication between the voice coil and the external circuit via the inner conduction structure 103 and the outer conduction structure 104; compared with the prior art, the present disclosure reduces the use of lead coil and the height of the sound-producing device in the vibration direction thereof. In this example, FIG. 3 shows a comparison diagram between the height of the existing sound-producing device 300 in the vibration direction and the height of the sound-producing device 200 of the present disclosure; as shown in FIG. 3, the conductive member 101 is provided at the root region of the voice coil body, and the first connecting part of the conductive member; upon being electrically connected to the inner conduction structure, passes through the avoidance part of the magnetic circuit system, extends to the housing, and is electrically connected to the outer conduction structure, therefore realizing the electrical communication between the voice coil and the external circuit via the conductive member; the height of the sound-producing device 200 of the present disclosure in its vibration direction is significantly lower than that of the existing sound-producing device 300. Wherein, the height of the sound-producing device 200 of the present disclosure in its vibration direction ranges from 15 mm to 20 mm, and preferably, the height of the sound-producing device 200 in the vibration direction is 17 mm to 19 mm. This example makes the sound-producing device lighter and smaller.

Preferably, the inner conduction structure 103 is a pad fixed on the side of the voice coil body close to the bottom end face thereof, and in this example, the pad has a bearing part configured to fix the first connecting part 1011 welded to the pad. The bearing part is in a bent structure, and this example facilitates the fixing of the first connecting part 1011 to the pad.

Preferably, the outer conduction structure 104 is provided close to the fixing pillar of the housing; the outer conduction structure 104 is a solder piece injected on the housing; wherein the solder piece is exposed on an outer surface of the housing. This example facilitates the connection between the external circuit and the sound-producing device.

Figure 2:
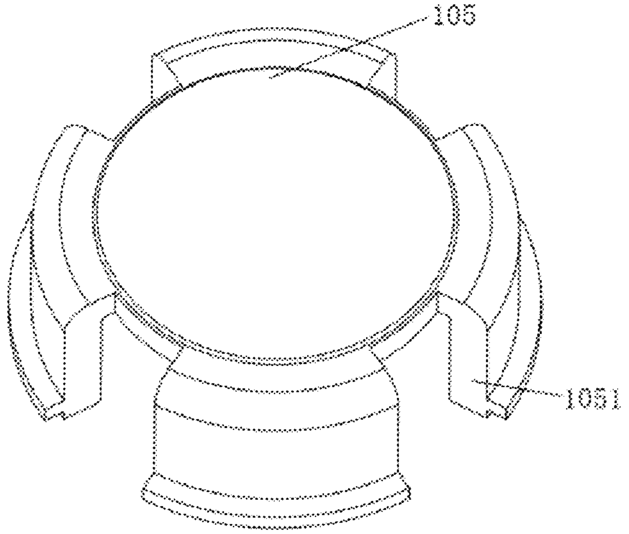
FIG. 2 shows a schematic structural diagram of the U iron of the present disclosure.

In one example, the magnetic circuit system is provided with an avoidance part corresponding to the conductive member 101; particularly, as shown in FIG. 2, the magnetic circuit system includes a basin-shaped U iron 105 where a magnet is provided; wherein in this example, the avoidance part is a notch 1051 provided on the U iron.

In this example, the conductive member 101 is configured to be able to pass through the notch 1051 to be connected to the side of the voice coil body close to the bottom end surface thereof. That is, the notch 1051 opened on the U iron 105 forms an avoidance space, so that the conductive member 101 can generate vibration along the vibration direction of the sound-producing device.

Here, a notch is provided at an opening angle ranging from 200 to 40'. Preferably, the notch is provided at an opening angle of 30°. Here, it is possible to ensure the vibration space of the conductive member within the angle range of the notch, so as not to affect the vibration frequency of the sound-producing device and the acoustic performance of the sound-producing device.

In one example, the conductive member is a two-piece separate structure symmetrically arranged on both sides of the voice coil body; or, the conductive member is a three-piece or four-piece separate structure evenly distributed on a circumference of the voice coil body. Wherein, the conductive members are arranged in a symmetrical manner or in an array manner, which can provide a good support for fixing the position of the voice coil.

Preferably, the notch correspondingly provided on the U iron is of the same number as the conductive member provided on the voice coil body. In this example, the conductive member is a four-piece separate structure evenly distributed on a circumference of the voice coil body, wherein the U iron is correspondingly provided with four notches.

In one example, the conductive member 101 is formed by integrally winding a metal wire, wherein the metal wire may be any one of copper wire, iron wire, steel wire or alloy wire. Wherein, the conductive member is formed by integrally winding a metal wire, such that the diaphragm in the sound-producing device can provide good compliance when vibrating under large displacement; at the same time, the conductive member is made of metal material, such that it is less affected by high temperature and high humidity environment and has excellent fatigue resistance, which also enables the sound-producing device to work in harsh environments.

In one example, the elastic member 1012 spreads outward along a direction from the first connecting portion 1011 towards the second connecting portion 1013, and the elastic part 1012 forms a spreading angle which is not less than 10°. The inventors found that as the spreading angle increases, the mechanical stiffness value of the conductive member decreases, and the mechanical stiffness linearity of the conductive member becomes better. For example, the mechanical stiffness of the conductive member ranges from 0.2 N/mm to 2 N/mm, and preferably, the mechanical stiffness of the conductive member is 0.56 N/mm. Within this range of mechanical stiffness, the conductive member has more excellent performance, and at the same time provides a good support for fixing the position of the voice coil.

The inventors found that the conductive member 101 is fixed on the root region of the voice coil body, so that the sound-producing device may have better compliance when the vibration displacement is large; at the same time, it can also reduce the distortion of the sound-producing device and improve acoustic performance of the sound-producing device.

Figure 4:
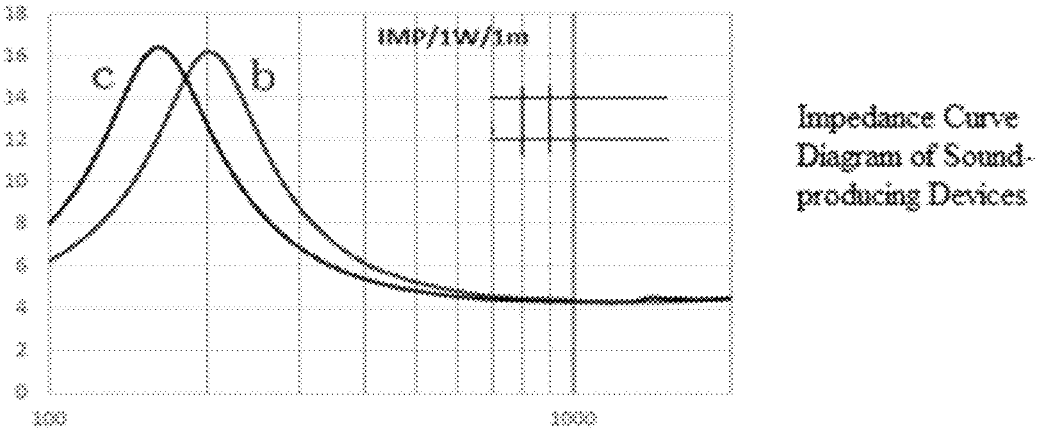
FIG. 4 shows an impedance curve diagram of the sound-producing device of the present disclosure and a sound-producing device using a conventional damper.

Particularly, as shown in FIG. 4, curve b represents the impedance curve of the prior art sound-producing device using a conventional damper; curve c represents the impedance curve of the sound-producing device of the present disclosure.

Wherein, the sound-producing device of the embodiment of the present disclosure has a resonance frequency F0 of 50 Hz to 300 Hz, and preferably, the resonance frequency F0 is 170 Hz. When applying the conventional damper, the resonant frequency F0 of the sound-producing device is 195 Hz. Therefore, when the conductive member is applied to the sound-producing device, it may make the sound-producing device have good low-frequency response and mid-frequency response, and improve the acoustic performance of the sound-producing device; wherein the sound-producing device may be a large bass sound-producing device or a mid-range sound-producing device, and may be a round sound-producing device as shown in the above embodiment, or a square sound-producing device.

Figure 5:
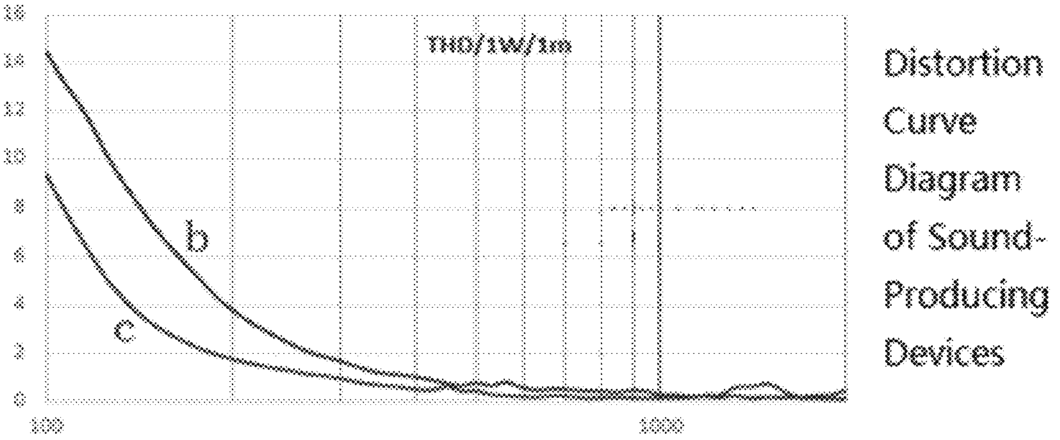
FIG. 5 shows a distortion curve diagram of the sound-producing device of the present disclosure and the sound-producing device using a conventional damper in the prior art.

At the same time, the application of the conductive member in the sound-producing device can reduce the total harmonic distortion THD of the sound-producing device and improve the acoustic performance of the sound-producing device. Specifically, as shown in FIG. 5, the abscissa represents the vibration frequency, and the ordinate represents the total harmonic distortion THD; curve b represents the total harmonic distortion THD of the sound-producing device when the traditional damper is applied to the sound-producing device, and curve c represents the total harmonic distortion THD of the sound-producing device when the conductive member of the present disclosure is applied to the sound-producing device.

For example, the total harmonic distortion THD of the sound-producing device of the present disclosure is less than 10% in the frequency range of 100 Hz to 300 Hz: specifically, when the frequency is 100 Hz, the total harmonic distortion THD of the sound-producing device is less than 10%; when the frequency is 200 Hz, the total harmonic distortion THD of the sound-producing device is less than 2.5%; when the frequency is 300 Hz, the total harmonic distortion THD of the sound-producing device is less than 2%;

When only the traditional damper is provided in the sound-producing device, the total harmonic distortion THD of the traditional sound-producing device is less than 16%; specifically, when the frequency is 100 Hz, the total harmonic distortion THD of the sound-producing device is less than 16%; when the frequency is 200 Hz, the total harmonic distortion THD of the sound-producing device is less than 5%; when the frequency is 300 Hz, the total harmonic distortion THD of the sound-producing device is less than 2.5%;

Therefore, the sound-producing device in this example has good acoustic performance.

According to another embodiment of the present disclosure, an electronic terminal is provided, wherein the electronic terminal comprises the sound-producing device of the present disclosure, for example, the electronic terminal may be a car audio or a speaker.

Although the present disclosure has been described in detail in connection with some specific embodiments by way of illustration, those skilled in the art should understand that the above examples are provided for illustration only and should not be taken as a limitation on the scope of the disclosure. Those skilled in the art will appreciate that modifications may be made to the above embodiments without departing from the scope and spirit of the present disclosure. We therefore claim as our disclosure all that comes within the scope of the appended claims.

The invention claimed is:

1. A sound-producing device, comprising:

a housing having an accommodating room including a magnetic circuit system;

a voice coil including a bobbin, a voice coil body wound outside the bobbin, and a bottom end suspended in a magnetic gap of the magnetic circuit system;

a conductive member having a first connecting part fixed to the voice coil, a second connecting part fixed to the housing, and an elastic part located therebetween;

wherein the conductive member is integral with a root region of the voice coil body, the magnetic circuit system includes an avoidance part corresponding to the conductive member; the voice coil includes an inner conduction structure, the housing includes an outer conduction structure in electrical conduction with an external circuit; and the first connecting part of the conductive member is adapted for electrical connection with the inner conduction structure to pass through the avoidance part of the magnetic circuit system and extend to the housing, and is electrically connected with the outer conduction structure.

2. The sound-producing device of claim 1, wherein the conductive member is connected to a side of the voice coil body close to a bottom end face thereof.

3. The sound-producing device of claim 2, wherein the inner conduction structure is a pad fixed on the side of the voice coil body proximate to the bottom end face thereof, the first connecting part is fixed to the pad by welding; and the voice coil body has an enameled wire fixed to the pad by welding.

4. The sound-producing device of claim 1, wherein the second connecting part is in a hooked shape, the housing is provided with a fixing pillar, and the second connecting part is sleeved on the fixing pillar.

5. The sound-producing device of claim 2, wherein the conductive member comprises a wound metal wire.

6. The sound-producing device of claim 5, wherein the metal wire is selected from the group consisting of a copper wire, an iron wire, a steel wire and an alloy wire.

7. The sound-producing device of claim 4, wherein the outer conduction structure is proximate to the fixing pillar of the housing; the outer conduction structure is a solder piece injected on the housing;

the second connecting part is fixed to the solder piece by welding upon being fixed together with the fixing pillar.

8. The sound-producing device of claim 7, wherein the solder piece is exposed on an outer surface of the housing.

9. The sound-producing device of claim 1, wherein the elastic part is in a plane structure.

10. The sound-producing device of claim 1, wherein the elastic part spreads outward along a direction from the first connecting part toward the second connecting part, with a buffer section forming a spreading angle which is not less than 10°.

11. The sound-producing device of claim 1, wherein the conductive member is selected from the group consisting of a two-piece separate structure symmetrically arranged on both sides of the voice coil body and a separate structure having at least three pieces evenly distributed on a circumference of the voice coil body.

12. The sound-producing device of claim 11, wherein the magnetic circuit system includes a basin-shaped U iron where a magnet is provided; and the avoidance part is a notch provided on the U iron.

13. The sound-producing device of claim 12, wherein notches correspondingly provided on the U iron are of the same number as conductive members provided on the voice coil body, and each of the notches is of an opening angle ranging from 20° to 40°.

14. The sound-producing device of claim 1, wherein the sound-producing device has a resonant frequency F0 of 50 Hz to 300 Hz.

15. The sound-producing device of claim 1, wherein the sound-producing device is a round sound-producing device or a square sound-producing device.

16. The sound-producing device of claim 1, wherein the sound-producing device is a large bass or mid-range sound-producing device.

17. An electronic terminal, comprising the sound-producing device of claim 1.

18. The electronic terminal of claim 17, wherein the electronic terminal is a car audio or a speaker.

* * * * *